(12) United States Patent
Kamoda et al.

(10) Patent No.: US 11,427,134 B2
(45) Date of Patent: Aug. 30, 2022

(54) TRACTOR

(71) Applicant: Iseki & Co., LTD, Ehime-ken (JP)

(72) Inventors: Hiroshi Kamoda, Ehime-ken (JP);
Itsuki Doi, Ehime-ken (JP); Yutaka Kajino, Ehime-ken (JP); Akihiro Machida, Ehime-ken (JP); Seiji Tanaka, Ehime-ken (JP); Shiro Ito, Ehime-ken (JP); Hisasada Fujiie, Ehime-ken (JP)

(73) Assignee: ISEKI & CO., LTD., Matsuyama (JP)

( * ) Notice: Subject to any disclaimer, the term of this patent is extended or adjusted under 35 U.S.C. 154(b) by 488 days.

(21) Appl. No.: 16/664,150

(22) Filed: Oct. 25, 2019

(65) Prior Publication Data
US 2020/0130601 A1   Apr. 30, 2020

(30) Foreign Application Priority Data

Oct. 26, 2018  (JP) .............................. JP2018-202317

(51) Int. Cl.
| | |
|---|---|
| *B60R 11/00* | (2006.01) |
| *G01S 17/04* | (2020.01) |
| *B60R 11/04* | (2006.01) |
| *B62D 25/18* | (2006.01) |
| *B62D 33/06* | (2006.01) |
| *G01S 15/04* | (2006.01) |

(52) U.S. Cl.
CPC .............. *B60R 11/00* (2013.01); *B60R 11/04* (2013.01); *B62D 25/18* (2013.01); *B62D 33/0617* (2013.01); *G01S 15/04* (2013.01); *G01S 17/04* (2020.01); *B60R 2011/004* (2013.01)

(58) Field of Classification Search
CPC ... B60R 11/00; B60R 11/04; B60R 2011/004; G01S 17/04; G01S 15/04; B62D 25/18; B62D 33/0617
See application file for complete search history.

(56) References Cited

FOREIGN PATENT DOCUMENTS

| | | | |
|---|---|---|---|
| JP | 2004017922 A | * | 1/2004 |
| JP | 2015159742 A | * | 9/2015 |
| JP | 2018-1113937 A | | 7/2018 |

* cited by examiner

*Primary Examiner* — Lori L Lyjak
(74) *Attorney, Agent, or Firm* — Finnegan, Henderson, Farabow, Garrett & Dunner, LLP

(57) ABSTRACT

A working vehicle may be provided that detects obstacles around a self-traveling tractor in a wide range, with reduced erroneous detection. A tractor may include a vehicle body including a front wheel and a rear wheel; a rear wheel fender covering the front and top of the rear wheel; a rear stay in a shape that extends along the rear wheel fender, a rear first obstacle sensor provided at the front of the rear stay; and a rear second obstacle sensor provided at the rear of the rear stay.

17 Claims, 3 Drawing Sheets

TRACTOR

CROSS REFERENCE TO RELATED APPLICATIONS

This application claims priority to Japanese Patent Application No. 2018-202317, filed Oct. 26, 2018, the disclosure of which is incorporated herein by reference in its entirety.

BACKGROUND

The present disclosure relates to a working vehicle such as an agricultural tractor, and more particularly to an arrangement of sensors, etc. for detecting obstacles around the vehicle.

There is a known working vehicle that comprises a plurality of obstacle sensors detecting obstacles around the vehicle, and flexibly changes the areas of obstacle detection according to the work travelling state obtained by a detection sensor (see, e.g., Japanese Unexamined Patent Application Publication No. 2018-113937).

SUMMARY

To obtain an appropriate detection area, arrangement of sensors is important. In the above-mentioned art, some arrangements of obstacle sensors may cause a big blind area in the detection area.

One object of the present disclosure is to provide a tractor that detects obstacles around the tractor in a wide range, with reduced erroneous detection.

To address the above technical concerns, some embodiments of the disclosure may provide the following technical means.

A first aspect of the disclosure includes a tractor comprising:
a vehicle body including a front wheel and a rear wheel;
a rear wheel fender covering the front and top of the rear wheel;
a rear stay in a shape that extends along the rear wheel fender,
a rear first obstacle sensor provided at the front of the rear stay; and
a rear second obstacle sensor provided at the rear of the rear stay.

A second aspect of the disclosure includes the tractor according to the first aspect, wherein in a side view, the rear first obstacle sensor is provided in front of a rear axle of the rear wheel; and in a side view, the rear second obstacle sensor is provided in rear of the rear axle of the rear wheel.

A third aspect of the disclosure includes the tractor according to the second aspect, wherein the rear first obstacle sensor is attached in such a way that the major axis of its obstacle detection range is substantially horizontal, and the rear second obstacle sensor is attached in such a way that the major axis of its obstacle detection range is substantially vertical.

A fourth aspect of the disclosure is the tractor of the first aspect, further comprising a side obstacle sensor provided between the front wheel and the rear wheel; wherein
the side obstacle sensor is provided outside an inner end of the front wheel, when the front wheel is in a straight travel position in a plan view.

A fifth aspect of the disclosure includes the tractor according to the first aspect, further comprising:
a cabin roof for a cabin mounted on the vehicle body;
a rear camera that is provided at a rear center of the cabin roof and takes pictures of the rear; and
a rear obstacle sensor disposed near, in rear of and above the rear camera.

Consequently, a tractor that detects obstacles around the tractor in a wide range with reduced erroneous detection may be provided. Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

DESCRIPTION OF EXEMPLARY EMBODIMENTS

An embodiment of a working vehicle of the present disclosure will now be explained with reference to the drawings.

Figure 1:
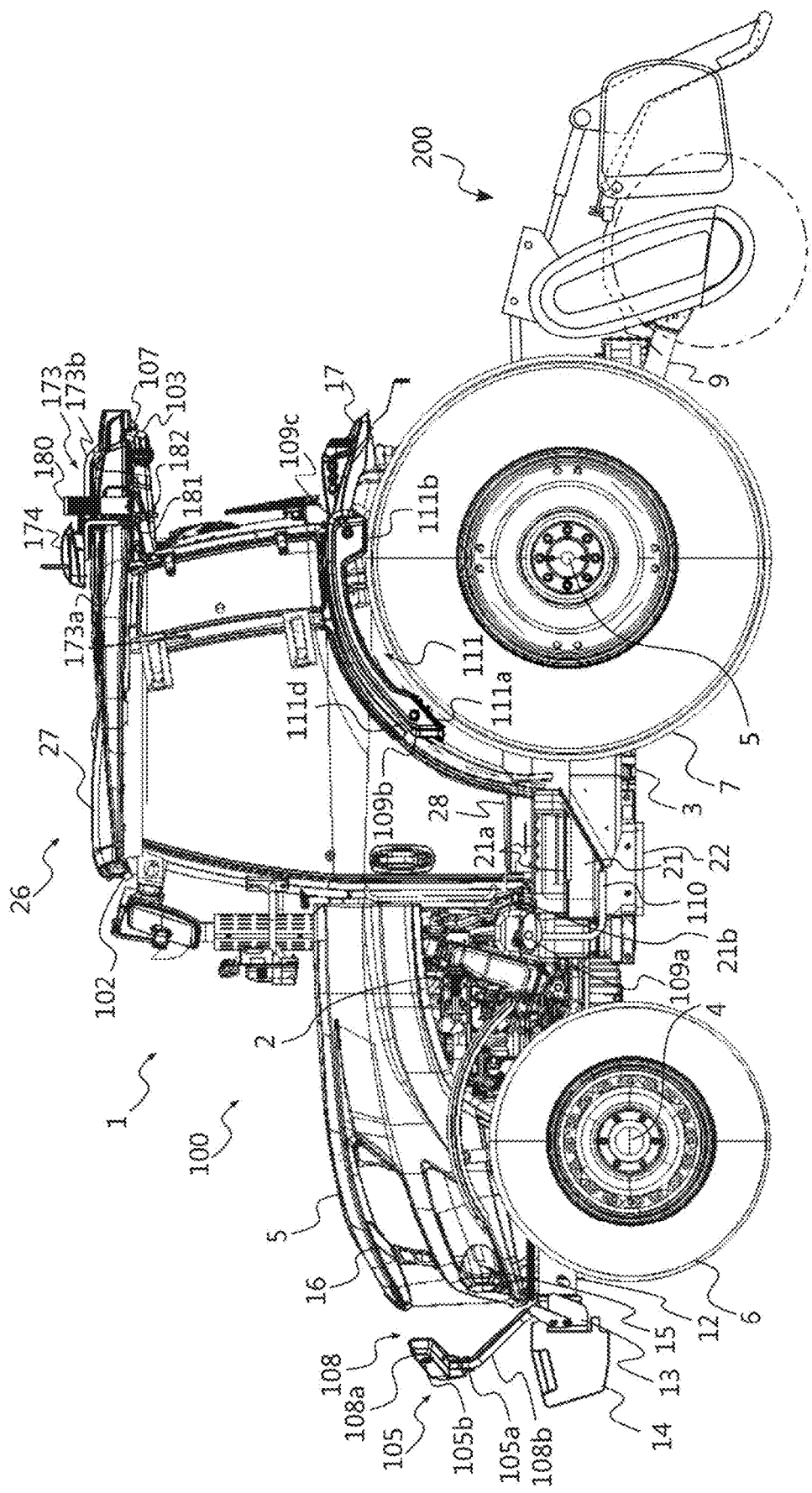
FIG. 1 illustrates a side view of a tractor.

FIG. 1 illustrates a whole side view of an example of a working vehicle, namely, a tractor 1, comprising a vehicle body 100 and an implement 200 attached thereto. The tractor 1 further comprises: a hood 50 in the front thereof; an engine 2 housed in the hood 50; a front axle 4; a rear axle 5; and a transmission case 3 configured to appropriately change the speed of the power of the engine 2 and transmitting it to the front axle 4 and the rear axle 5. The tractor 1 also comprises front wheels 6 and rear wheels 7, and travels by driving the front wheels 6 and rear wheels 7 or only the rear wheels 7, while controlling the direction of travel by steering the front wheels 6. The tractor 1 further comprises a lower link 9 that projects rearward from the machine body, and the implement 200 such as a rotary tiller is attached thereto. The implement 200 is driven by a power takeoff (PTO) shaft that projects rearward from the transmission case 3.

The tractor 1 further comprises a cabin roof 27, and a global positioning system (GPS) antenna 174 as an example of a positioning device is provided on an upper surface of the cabin roof 27. The GPS antenna 174 measures its position by receiving positioning signals sent from a plurality of GPS satellites. The GPS antenna 174 is attached to the cabin roof 27 by a GPS antenna stay 173. The GPS antenna stay 173 includes a beam portion 173a provided from side to side of the cabin roof 27, and an antenna fixation member 173b that extends forward from a rear end of the cabin roof 27 to its upper surface conforming to the shape of the roof. The beam portion 173a is provided with a stack light 180 that is attached to a stack light stay 181, and the stack light 180 is visible from around the tractor 1. Furthermore, a side camera 182 is attached to a bottom surface of the stack light stay 181.

The tractor 1 further comprises a front camera 102 that is attached to a front center of the cabin roof 27 and is configured to image (e.g., take pictures of) a front region (e.g., areas ahead of the tractor 1). The tractor 1 also comprises a rear camera 103 that is attached to the rear of the antenna fixation member 173b of the GPS antenna stay 173, and is configured to image a rear region (e.g., areas behind the tractor 1) from a rear center of the cabin roof 27. At the rear of the antenna fixation member 173b, a rear obstacle sensor 107 is attached. The rear obstacle sensor 107 may be adjacent to the rear camera 103. The rear obstacle sensor 107 is provided to the rear of and above the rear camera 103. The rear obstacle sensor 107 is configured to emit infrared light toward the rear, and if an obstacle is detected at the rear of the tractor 1 by reception of reflection of the infrared light, the rear obstacle sensor 107 is configured to detect a distance to the obstacle. As used herein, terms such as front and rear may refer to a reference frame of tractor 1, and may correspond with forward and reverse travel directions, respectively.

Below the hood 50, a vehicle body frame 12 attaching the front axle 4 is provided. The vehicle body frame 12 has a front end provided with a weight bracket 13 attaching a weight 14 to balance the vehicle's weight. The tractor 1 further comprises an obstacle sensor stay 108 that has a base end attached to the weight bracket 13, and a tip end that extends toward the front of the weight bracket 13, above the weight bracket 13. A front obstacle sensor 105 is attached to the obstacle sensor stay 108. The front obstacle sensor 105 is attached in front of a rear end of the weight 14 and above the weight 14. Consequently, the detection range of the front obstacle sensor 105 is set to cover a wide vertical range, avoiding the weight 14.

The front obstacle sensor 105 includes: a first front obstacle sensor 105a that emits infrared light toward the front, and if an obstacle is detected in front of the tractor 1 by reception of reflection of the infrared light, detects a distance to the obstacle; and a second front obstacle sensor 105b that emits an acoustic wave, and if an obstacle is detected in front of the tractor 1 by reception of reflection of the acoustic wave, detects a distance to the obstacle. The first front obstacle sensor 105a is attached to a center of a sensor attachment member 108a of the obstacle sensor stay 108 extending in a right-left direction. The right-left direction may refer to a lateral direction that is perpendicular to a travel direction of the tractor 1. The second front obstacle sensor 105b may include a pair of sensors, wherein a sensor is provided at the respective right and left sides of the sensor attachment member 108a, at an outer side of and above the first front obstacle sensor 105a.

The obstacle sensor stay 108 is detachably fixed to an outer surface of the weight bracket 13 by a support frame 108b. The support frame 108b vertically extends at a center in the right-left direction of the vehicle, and has a shape such that it does not overlap, in a front view, with a headlight 15 provided at the bottom of the hood 50. The obstacle sensor stay 108 is provided at a position that does not overlap, in a front view and side view, with a work light 16 provided at the top of the hood 50.

At a side of the tractor 1, a side obstacle sensor 109a is provided. The side obstacle sensor 109a may include a pair of sensors, one on each side of the tractor 1. A side stay 110 attaching the side obstacle sensor 109a is detachably attached to a bottom surface of a fuel tank 21. The side stay 110 extends forward under the fuel tank 21, and is bent upward in front of the fuel tank 21. The side stay 110 is disposed between the front wheels 6 and the rear wheels 7, and below upper ends of a floor surface 28 that forms a floor of a platform member 26 for workers to get on. Consequently, the side obstacle sensor 109a detects obstacles near a lower step 22, whereas it does not block the view of the front bottom viewed from the platform member 26. The side obstacle sensor 109a is also provided at a position that does not interfere, in a side view, with the lower step 22, a step portion 21a of the fuel tank 21, and a filler opening 21b. Consequently, getting on/off the machine, fuel filling, etc. are smoothly performed from a side of the machine.

A rear first obstacle sensor 109b and a rear second obstacle sensor 109c are attached to a rear stay 111 in a shape that extends along a rear wheel fender 17 covering the front and top of the rear wheel 7. The rear first obstacle sensor 109b is attached to a front projection 111a of the rear stay 111, and the rear second obstacle sensor 109c is attached to a rear projection 111b of the rear stay 111. The rear first obstacle sensor 109b and the rear second obstacle sensor 109c are attached substantially at 90° to each other.

In a side view, the rear first obstacle sensor 109b and the rear second obstacle sensor 109c are respectively attached in front of and to the rear of the rear axle 5, and at an outer side of the right/left rear wheel fender 17. The rear second obstacle sensor 109c is attached in a rear of (e.g., behind) and above the rear first obstacle sensor 109b. The rear first obstacle sensor 109b and the rear second obstacle sensor 109c may each include a pair of sensors, one on each side of the tractor 1.

The rear stay 111 may be formed in the shape of a curved line wherein the shape of the top of the rear stay 111 substantially conforms to the shape of the rear wheel fender 17.

Between the front projection 111a and the rear projection 111b, an intermediate recess 111c is provided such that maintenance work of the rear wheels 7 such as attachment/detachment thereof is easily performed.

The rear stay 111 is fixed to a bottom surface side of the rear wheel fender 17 by an attachment member 111d. The attachment member 111d is bent upward from a side of the rear wheel fender 17, and the top of the rear stay 111 is positioned above a portion that faces an outer end surface of the rear wheel fender 17. Consequently, the rear first obstacle sensor 109b and the rear second obstacle sensor 109c are disposed above the rear wheel 7, thereby avoiding the rear wheel 7.

Figure 2:
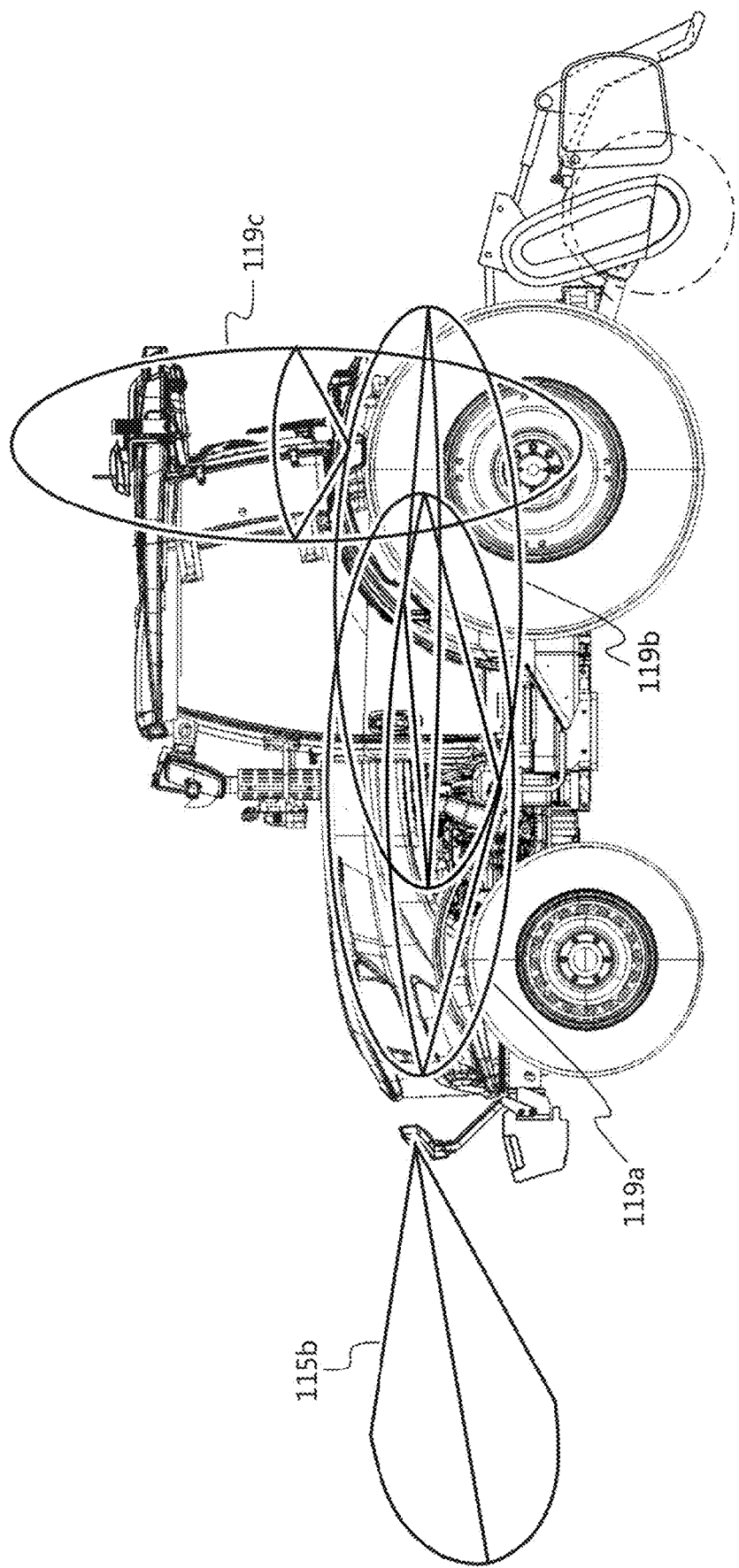
FIG. 2 illustrates a schematic side view of the tractor showing detection ranges of sensors.
Figure 3:
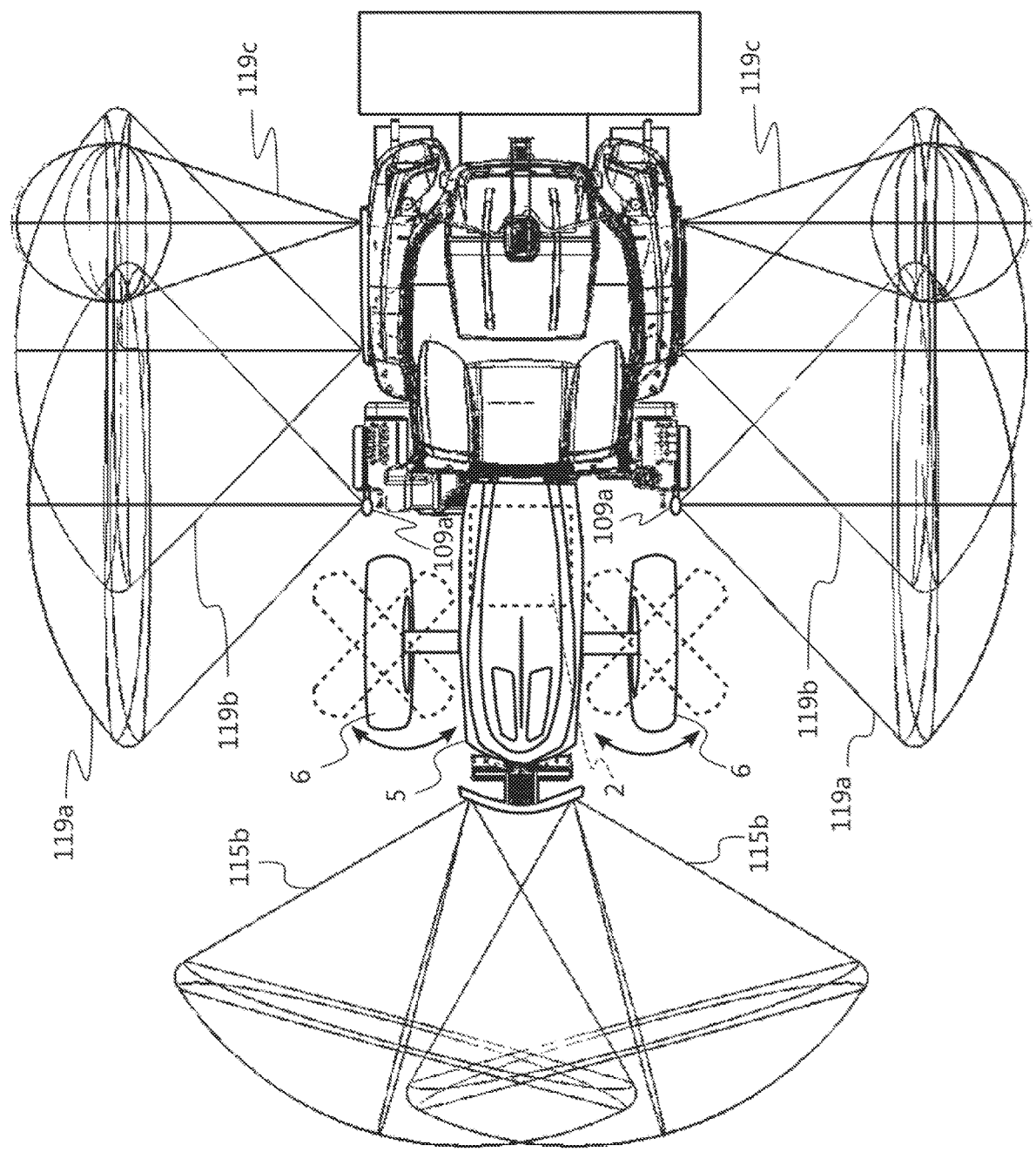
FIG. 3 illustrates a schematic plan view of the tractor showing detection ranges of sensors.

FIG. 2 illustrates a side view of detection ranges of the obstacle sensors. FIG. 3 illustrates a plan view of detection ranges of obstacle sensors. Specifically, the drawings illustrate an obstacle detection range 115b of the second front obstacle sensor 105b, an obstacle detection range 119a of the side obstacle sensor 109a, an obstacle detection range 119b of the rear first obstacle sensor 109b, and an obstacle detection range 119c of the rear second obstacle sensor 109c. As illustrated, each obstacle sensor may have a detection range in an oval cone shape. A center line of oval cone shapes may directed substantially perpendicularly away from tractor 1. The sensors are attached in different directions in such a manner that the major axes of the obstacle detection range 115b of the second front obstacle sensor 105b, the obstacle detection range 119a of the side obstacle sensor 109a, and the obstacle detection range 119b of the rear first obstacle sensor 109b are substantially horizontal, whereas the major axis of the obstacle detection range 119c of the rear second obstacle sensor 109c is substantially vertical. Consequently, the detection range of the rear second obstacle sensor 109c is kept from being expanded to the rear of the tractor 1, such that the implement 200 attached at the rear of the tractor 1 is not erroneously detected as an obstacle.

The side obstacle sensor 109a is provided outside the inner end of the front wheel 6, at least when the front wheel 6 is in a straight travel position in a plan view. Consequently, the side obstacle sensor 109a is kept from erroneously detecting the steered front wheel 6 as an obstacle, while maintaining a wide detection range of obstacles. Furthermore, the side obstacle sensor 109a is disposed at a distance to a side from the engine 2 in the hood 50, and the influence of hot air from the engine 2 may be reduced.

Note that in the present embodiment, the side stay 110 is attached to the bottom surface of the fuel tank 21 with the step portion 21a, however, it may be attached to the lower step 22. Also, the front obstacle sensor 105, the side obstacle sensor 109a, the rear first obstacle sensor 109b, and the rear second obstacle sensor 109c may be attached to existing tractors. For example, the sensors may be configured as attachable and detachable together with the obstacle sensor stay 108, the side stay 110, and the rear stay 111, respectively.

REFERENCE NUMERAL LIST

1 tractor
6 front wheel
7 rear wheel
17 rear wheel fender
27 cabin roof
100 vehicle body
103 rear camera
107 rear obstacle sensor
109a side obstacle sensor
109b rear first obstacle sensor
109c rear second obstacle sensor
111 rear stay

What is claimed is:

1. A tractor comprising:
   a vehicle body including a front wheel and a rear wheel;
   a rear wheel fender covering a front and top of the rear wheel;
   a rear stay formed in a shape that extends along the rear wheel fender;
   a rear first obstacle sensor provided at a front end of the rear stay; and
   a rear second obstacle sensor provided at a rear end of the rear stay.

2. The tractor of claim 1, wherein in a side view, the rear first obstacle sensor is provided in front of a rear axle of the rear wheel, and the rear second obstacle sensor is provided behind the rear axle of the rear wheel.

3. The tractor of claim 2, wherein the rear first obstacle sensor is attached in such a way that a major axis of its obstacle detection range is substantially horizontal, and the rear second obstacle sensor is attached in such a way that a major axis of its obstacle detection range is substantially vertical.

4. The tractor of claim 1, further comprising a side obstacle sensor provided between the front wheel and the rear wheel; wherein the side obstacle sensor is provided outside an inner end of the front wheel, when the front wheel is in a straight travel position in a plan view.

5. The tractor of claim 1, further comprising:
   a cabin roof for a cabin mounted on the vehicle body;
   a rear camera that is provided at a rear center of the cabin roof and configured to image a rear region; and
   a rear obstacle sensor disposed adjacent to, behind and above the rear camera.

6. The tractor of claim 1, wherein the rear first obstacle sensor and the rear second obstacle sensor are configured to have a detection range in an oval cone shape.

7. The tractor of claim 6, wherein each of the detection ranges of the rear first obstacle sensor and the rear second obstacle sensor have a center line directed substantially perpendicularly away from the tractor.

8. The tractor of claim 7, wherein the center lines are parallel to each other.

9. The tractor of claim 1, wherein the rear first obstacle sensor and the rear second obstacle sensor are attached to the rear stay substantially at 90° to each other.

10. The tractor of claim 1, wherein the rear first obstacle sensor and the rear second obstacle sensor are configured so as not to detect an implement attached to the vehicle body as an obstacle.

11. The tractor of claim 4, wherein the side obstacle sensor is configured so as not to detect the front wheel or the rear wheel as an obstacle.

12. The tractor of claim 1, further comprising a front obstacle sensor that includes:
    a first front obstacle sensor configured to emit infrared light toward a front region; and
    a second front obstacle sensor configured to emit an acoustic wave.

13. The tractor of claim 12, wherein the first front obstacle sensor is configured such that if an obstacle is detected in the front region by reception of reflection of the infrared light, the first front obstacle sensor detects a distance to the obstacle.

14. The tractor of claim 12, wherein the second front obstacle sensor is configured such that if an obstacle is detected in the front region by reception of reflection of the acoustic wave, the second front obstacle sensor detects a distance to the obstacle.

15. The tractor of claim 12, wherein an obstacle detection range of the rear first obstacle sensor or the rear second obstacle sensor does not overlap with an obstacle detection range of the front obstacle sensor.

16. The tractor of claim 12, further comprising a front camera configured to image the front region.

17. The tractor of claim 2, wherein in the side view, the rear second obstacle sensor is attached behind and above the rear first obstacle sensor.

\* \* \* \* \*